United States Patent [19]

Harkins

[11] Patent Number: 4,775,104
[45] Date of Patent: Oct. 4, 1988

[54] MIXING AND SPRAY DIRECTING DEVICE

[76] Inventor: Chris Harkins, 9601 El Mirador Blvd., Desert Hot Springs, Calif. 92240

[21] Appl. No.: 82,673

[22] Filed: Aug. 7, 1987

[51] Int. Cl.⁴ .............................................. B05B 7/24
[52] U.S. Cl. ................................... 239/314; 222/175; 47/48.5; 111/7.2; 239/375
[58] Field of Search .............. 239/310, 314, 316, 315, 239/318, 319, 329, 337, 374, 375, 10, 193, 194; 248/359 R; 222/175, 129, 630, 637; 47/1.7, 1.5, 48.5; 111/7.1, 7.2; 422/265

[56] References Cited

U.S. PATENT DOCUMENTS

| | | | |
|---|---|---|---|
| 2,734,632 | 2/1956 | De Ment | 239/314 |
| 2,785,011 | 3/1957 | Albano | 239/314 |
| 3,032,274 | 5/1962 | Budwig | 239/310 |
| 3,037,708 | 6/1962 | Schneider et al. | 239/310 |
| 3,460,562 | 8/1969 | Moulder | 47/48.5 |
| 4,688,751 | 8/1987 | Valot | 248/359 |

Primary Examiner—Andres Kashnikow
Assistant Examiner—Chris Trainor
Attorney, Agent, or Firm—Frank D. Gilliam

[57] ABSTRACT

A hand held device for directing water soluble insecticide or the like on growing plants by use of a directable hand held source of water under pressure. A quantity of water soluble insecticide fertilizer, plant food or the like in the form of a solid bar or brick is attached to a length of dowel or a paddle like structure with a water directing end surface. By directing a stream of water on the water soluble bar or brick, the water soluble substance of the bar or brick is mixed with water and directed toward a selected plant. Manipulation of the water stream and/or dowel or paddle like structure can provide precise directional flow of the mixture.

2 Claims, 1 Drawing Sheet

FIGURE 1
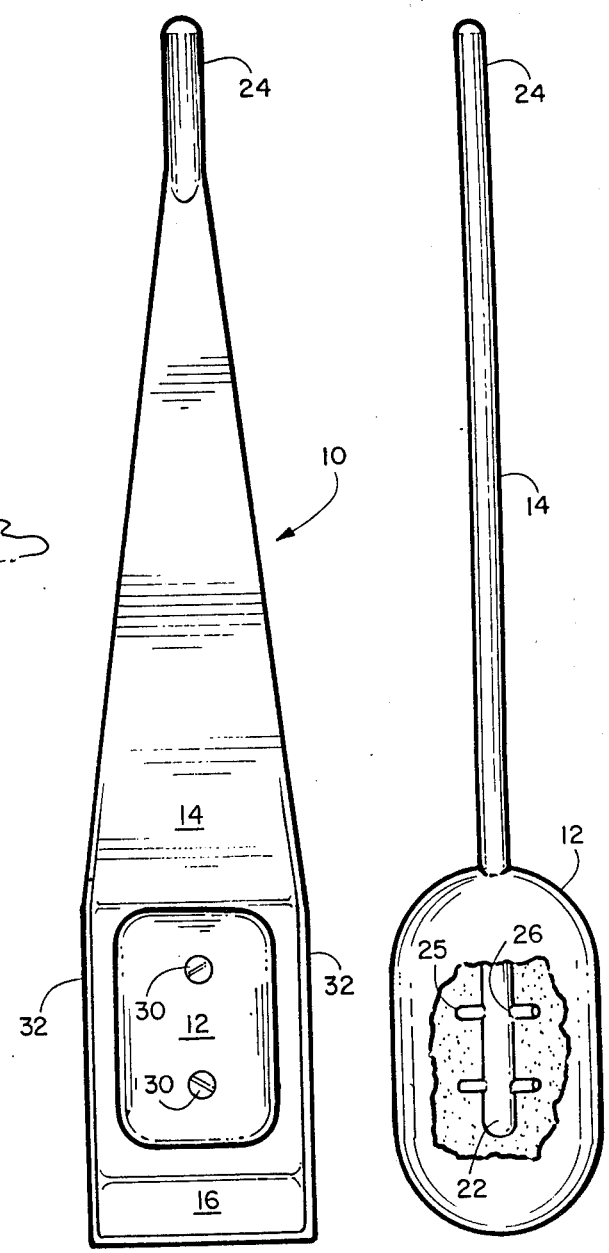
FIGURE 3
FIGURE 2
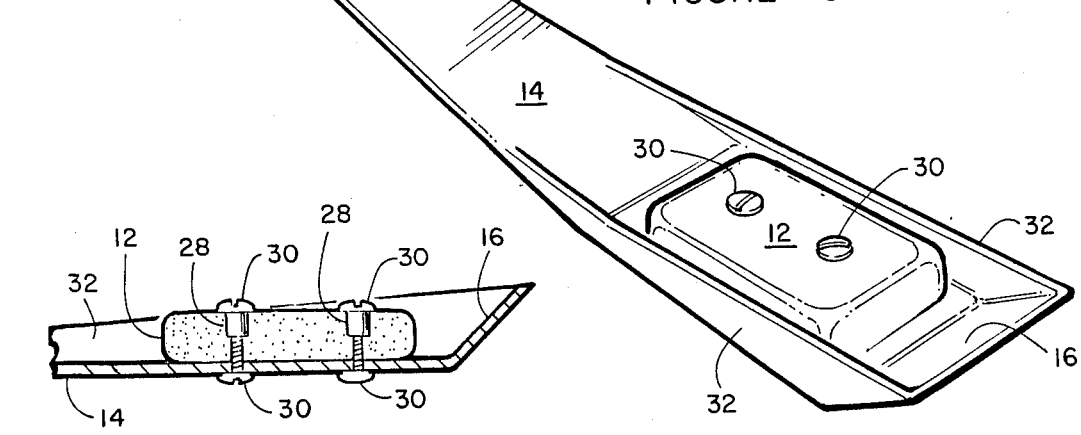
FIGURE 5
FIGURE 4

MIXING AND SPRAY DIRECTING DEVICE

BACKGROUND OF THE INVENTION

The invention is directed to the selective application of fertilizer, insecticides, and other chemicals to growing plants and the like and more particularly to a mixing device for mixing the above referenced substances with a directable stream of water and directing that mixture to a specific area to be treated.

U.S. Pat. No. 1,848,708 by inventor F. L. Gatchet, teaches a quantity of fertilizer of granular form in a container attached to the distal end of a garden hose. The fertilizer is pulled by suction into the water stream and mixed therewith as the water exits the garden hose. As long as the water flows and the container contains granular fertilizer the mixing will occur.

U.S. Pat. No. 1,866,620 by inventor M. D. Chesnut, teaches a device for mixing a liquid with water and further providing a control means to regulate the mixture as to the amount of liquid mixing with the water stream. The mixing device is attached to the distal end of the water stream delivery means.

U.S. Pat. No. 2,785,011, by inventor A. F. Albano, teaches a body of water soluble material positioned at the end of a water hose whereby water leaving the hose impels upon the water soluble material mixing water with the soluble material as the stream leaves the water soluble material. As long as water flows from the hose and water soluble material is present, a mix will occur.

U.S. Pat. No. 2,948,480, by inventor G. G. Bundwig, teaches mixing a liquid substance with a water stream by means of suction whereby the mix continues until the water stream is terminated or the liquid is completely dispensed.

The above referenced devices, except for U.S. Pat. No. 1,866,620, dispense material into the water stream for mixing in a constant mix amount until all of the material is dispensed or the stream of water is terminated. Although the valve of U.S. Pat. No. 1,866,620 is intended to adjust the quantity of liquid mixing with the water stream termination of liquid mixing with the water stream could be accomplished by closing the valve; However, this would be awkward as the valve would have to be re-adjusted as to mixture and would result in inaccuratable mixtures and improperly directed stream of the mixture while the valve was being readjusted.

Except for U.S. Pat. No. 1,866,620, a stream of water alone cannot be directed from the devices and a quantity of the water soluble material mixed with the stream cannot be stopped and started as desired.

There is a continuing need for improved devices for the mixing of gardening material with a stream of water which allow mixing of the materials with water when desired and utilizing the stream of water alone otherwise in a normally executed manner between mixing requirements.

SUMMARY OF THE INVENTION

The invention is directed to a convenient means for mixing gardening materials such as, for example, fertilizer, insecticides, and other gardening chemicals in a soluble base such as soap, detergent, or the like as well as inert soluble materials with water for their application.

The invention comprises a soluble form of the gardening chemical generally mixed with soap or detergent as a base and formed in a bar or a brick. This bar or brick is fixedly attached to an elongated handle or dowel like structure or to a flat paddle like structure which has an upwardly directed lip or edge at the down stream end thereof. The attachment of the bar or bricks to the handle structure may be by rivets constructed of plastic, galvanized metal, wood or other substances that withstand water for long periods of time. These rivets may be installed through holes in the material or cast in the material.

In operation the handle with the soluble material at the distal end is impacted by a stream of water from a hose or the like directed against the soluble material and a selected plant or object intended to receive the mixture.

When a mixture of soluble material and water is not desired, the water alone can be directed as needed free of soluble material.

An object of the invention is to provide a convenient means to selectively apply gardening materials to selected areas while watering growing plants in a normal manner.

Another object of the invention is to provide a water soluble base for gardening materials in bar or brick form and attaching that bar or brick to a hand held support therefore in a manner which allows a mixing of gardening materials with a water stream under pressure and selectively directing that mixture toward a desired area of a garden or the like.

These and other object and advantages of the invention will be set forth in the following description made in connection with the accompanying drawings in which like reference characters refer to similar parts through the several views and in which:

BRIEF DESCRIPTION OF THE DRAWING

FIG. 1 is a perspective showing of a person utilizing the device of the invention;

FIG. 2 is a partial cutaway showing of one embodiment of the invention;

FIG. 3 is a top plan view of a second embodiment of the invention; and

FIG. 4 is a partial side view showing taken along line 4—4 of FIG. 3.

DETAILED DESCRIPTION OF THE INVENTION

Referring now to the drawings Figures and particularly to FIG. 1. FIG. 1 depicts a person employing the mixing and spraying device 10 of the invention. As shown a bar or brick of gardening material 12 consisting of a water soluble base or carrier which is mixed with or impregnated with a gardening chemical such as, by way of example fertilizer, insecticides and the like normally used in home gardening. This bar or brick of gardening material is fixedly attached to the end of a support member 14 in the form of a rounded wooden support such as a dowel, or the like or a flat paddle like structure which has an upwardly directed lip 16 for providing a mist or spray when the material is impacted with a stream of water under pressure. The structure of the device 10 will be more fully explained under the description of the drawings FIGS. 2–4.

As shown the device 10 is held by a gardener 17 in one hand while the gardener has a hose 18 with a stream of water 20 under pressure emitting therefrom which is held in the other hand of the gardener. When the gardener 17 desires to direct a mixture of the soluble material from the bar or brick and water to a selected location in the garden, such as directing fertilizer or insecticide to a plant, the gardener directs the flow of water unto the bar or brick causing the water to mix with the soluble material of the bar or brick and then further directs that mixture toward the desired location by movement of the device 10 so that the mixture leaving the device is directed as desired.

When watering alone is desired, the hose can be directed away from the bar or brick toward the area to be watered. It should be obvious that the soluble material is not dedicated to be mixed with the stream of water at all times and selected use by the gardener as desired prevents waste of the material and its placement on undesirable garden areas.

Referring now to FIG. 2 which depicts a partial cutaway bottom plan view of one embodiment of the device 10 of the invention. The handle member 14 is shown in the shape of a rounded wooden shaft or dowel. At the end of 22 opposite the hand held end 24 is positioned the bar or brick of water soluble material 12. The bar or brick is fixedly attached to the end 22 by wooden pins or the like 25 which are fixedly attached through apertures 26 in the end 22. Although, wood is the preferred material for the pins 25 any material suitable for the intended purpose may be employed. The bar or brick is cast or molded over the end 22 and forms an integrated portion thereof. When the bar or material is used up, the support member 14 can be discarded.

FIG. 3 depicts a top plan view of second embodiment of the support member 14 of the invention. The support member in this embodiment takes the form of an elongated flat paddle like structure. In this embodiment, the bar or brick is "riveted" to the support member by means of plastic rivets 28 which pass through the support member 14 and bar or brick 12 and hold the bar or brick to the support member by means of the enlarged heads 30 positioned at each end of the rivets. In this embodiment, when the bar or brick is completely used, a new bar or brick can be attached to the support member 14 and the device can be recycled in this manner many times.

The embodiment shown in FIGS. 3 and 4 includes side walls 32 extending from the end 22 towards the center of the length of the support member and an angled lip 16 at the end 22 thereof. These walls form a trough for directing the stream of water 20 from the hose 18 to the bar or brick and the lip 16 causes the mixture to form a spray as it leaves the support member.

Although plastic rivets are preferred any equivalent means can be employed to attach the bar or brick to the handle member. For ease of removal and installation of the bar or brick to the handle member two piece aluminium screws with enlarged heads at each end can be employed.

The handle member of the FIGS. 3 and 4 showing can be constructed of wood, plastic or the like.

While particular embodiments of the invention have ben shown and described, it is not intended to limit the same to the exact details of the construction set forth, modification, and equivalent of the parts and then formation and arrangement as come within the previews of the appended claims.

What is claimed is:

1. In combination with a manually held and directed source of water under pressure, a separate hand held device for mixing and applying chemicals to selected plants when said source of water under pressure is selectively directed thereon comprising:
    a support member, constructed of elongated wooden material, being separate from said source of water under pressure, and having a handle at one end for grasping by the user, said support member further including a pair of pins there through normal to the longitudinal center line of said support member and extending on each side thereof, and located remotely from said handle; and
    a bar or brick, formed from a water soluble material mixed or impregnated with a garden chemical, fixedly attached to the end of said support member, wherein said bar or brick is cast around said support member and pins such that water under pressure may be selectively directed on said bar or brick causing said soluble material to mix with said water and be directed to the selected plants.

2. In combination with a manually held and directed source of water under pressure, a separate hand held device for mixing and applying chemicals to selected plants when said source of water under pressure is selectively directed thereon comprising:
    a support member being separate from said source of water under pressure and having a handle at one end for grasping by the user; and
    a bar or brick, formed from a water soluble material mixed or impregnated with a garden chemical, fixedly attached to the end of said support member remote from said handle; and
    wherein said support member is constructed in the form of a flat paddle having raised wall means along the sides thereof and an end lip positioned adjacent to said bar or brick, said bar or brick being riveted to said support member such that water under pressure may be selectively directed on said bar or brick causing said soluble material to mix with said water and be directed to the selected plants.

* * * * *